United States Patent
Sander et al.

(10) Patent No.: US 7,771,557 B2
(45) Date of Patent: Aug. 10, 2010

(54) METHOD FOR JOINING A STRINGER TO A STRUCTURAL COMPONENT OF AN AIRCRAFT OR SPACECRAFT

(75) Inventors: Peter Sander, Bremen (DE); Hans Marquardt, Fredensbeck (DE); Hauke Lengsfeld, Helmste (DE)

(73) Assignee: Airbus Deutschland GmbH, Hamburg (DE)

( * ) Notice: Subject to any disclaimer, the term of this patent is extended or adjusted under 35 U.S.C. 154(b) by 462 days.

(21) Appl. No.: 11/904,311

(22) Filed: Sep. 26, 2007

(65) Prior Publication Data
US 2008/0083491 A1    Apr. 10, 2008

Related U.S. Application Data

(60) Provisional application No. 60/847,553, filed on Sep. 27, 2006.

(51) Int. Cl.
*B29C 65/00* (2006.01)
(52) U.S. Cl. ........................ 156/285; 156/286; 156/381; 264/510; 264/257; 264/258; 244/131
(58) Field of Classification Search ................. 156/285, 156/286, 381; 264/257, 258, 510; 244/131
See application file for complete search history.

(56) References Cited

U.S. PATENT DOCUMENTS

| | | | | |
|---|---|---|---|---|
| 5,593,633 A | * | 1/1997 | Dull et al. | 264/510 |
| 6,706,230 B2 | * | 3/2004 | Sato et al. | 264/257 |
| 2001/0005061 A1 | * | 6/2001 | Holsinger | 264/257 |

* cited by examiner

*Primary Examiner*—Richard Crispino
*Assistant Examiner*—Christopher Schatz
(74) *Attorney, Agent, or Firm*—Jenkins, Wilson, Taylor & Hunt, P.A.

(57) ABSTRACT

The invention relates to a method for joining an uncured stringer to a structural component of an aircraft or spacecraft. The uncured stringer is supplied with at least one joining section and at least one web section. A rapidly curing low-temperature auxiliary material is deposited on web flanks of the at least one web section, which are to be supported. The at least one joining section of the uncured stringer is fitted to the structural component. Curing of the auxiliary material then takes place at a first curing temperature in order to form cured supporting elements for the web flanks of the at least one web section, which are to be supported. Curing of the uncured stringer is undertaken at a second curing temperature which is greater than the first precuring/curing temperature, and then the deposited and cured auxiliary material is removed.

8 Claims, 1 Drawing Sheet

METHOD FOR JOINING A STRINGER TO A STRUCTURAL COMPONENT OF AN AIRCRAFT OR SPACECRAFT

CROSS-REFERENCE TO RELATED APPLICATIONS

This application claims the benefit of U.S. Provisional Application No. 60/847,553, filed Sep. 27, 2006, and the entire disclosures of which is herein incorporated by reference.

FIELD OF THE INVENTION

The present invention relates to a method for joining a stringer to a structural component of an aircraft or spacecraft.

BACKGROUND OF THE INVENTION

A problem on which the invention is based is explained below with reference to the production of a rudder unit for an aircraft. However, this is not to be considered as a limitation for the method according to the invention which can be used in general for joining stringers to structural components.

The surface of a rudder unit of an aircraft is formed essentially by panel elements. Supporting stringers which impart the necessary rigidity to the rudder unit and which connect the individual panel elements to one another are arranged within the rudder unit. Said stringers are typically formed by "I-shaped stringers".

For the production of a rudder unit which may be produced entirely from fiber composite materials, in particular the outer panel elements and the inner I-shaped stringers, suitable methods are required to ensure that the I-shaped stringers are joined to the panel elements.

A method known to the applicant makes provision to supply the panel elements in the form of unimpregnated semi-finished fiber products. The I-shaped stringers are arranged on the panel elements. The semifinished fiber product of the panel elements is then impregnated by means of an injection method. The stringers resting on the surface of the panel elements are wetted in the process by the resin and are stuck on.

The injection method requires a vacuum film to be arranged with a positive fit on the surface of the panel elements and the T-shaped supports. This requires a considerable, even partially manual effort in order to deposit the vacuum film in a manner such that it follows the contour of the T-shaped stringer, for example on the internal or fillable surfaces in the case of cutouts, recesses, corner regions and edges. In the process, it is to be avoided that the vacuum film is not tensioned (roof effect), since, firstly, the vacuum film could be destroyed by the pressure prevailing in this process, for example in an autoclave, and, secondly, likewise because, of the pressure, a stringer which is not yet cured would be displaced out of its predetermined position and deformed.

In order to join uncured stringers to a structural component and to cure them, complicated supporting elements, for example made of metal, wood and/or pressurized rubber, are currently joined on both sides to the stringer web. This prevents the stringer web from tilting laterally and/or changing its geometry when its matrix is softened by means of raised temperature.

SUMMARY OF THE INVENTION

An object of the present invention is to simplify the method for joining stringers to structural components and to remove the abovementioned disadvantages.

This object is achieved by the method with the features of independent claim 1.

Accordingly, an uncured or not fully cured stringer is supplied with at least one joining section and at least one web section. A rapidly curing low-temperature auxiliary material is deposited on web flanks to be supported of the at least one web section of the stringer. The at least one joining section of the uncured first stringer is fitted to the structural component. Precuring/curing of the auxiliary material takes place at a first precuring/curing temperature in order to form precured/cured supporting elements for the web flanks of the at least one web section, which are to be supported. Curing of the uncured stringer is undertaken at a second curing temperature which is greater than the first precuring/curing temperature, and the deposited and precured/cured auxiliary material is subsequently removed.

Since the auxiliary material is deposited in uncured form in the production of stringers, it advantageously simply matches the shape of the stringer. A separately premanufactured supporting element is therefore no longer necessary.

In one embodiment, it is provided that the auxiliary material is also at least partially deposited on surfaces which belong to the joining section of the first stringer and are adjacent to the web section. As a result, firstly, increased stability of the supporting elements and, consequently, of the stringer to be supported are achieved.

In particular, a separating element, for example in the form of a film, is deposited between the auxiliary material and the stringer in order to be able to simply remove the auxiliary material from the stringer after joining of the same to the structural component.

The auxiliary material may be precured/cured, for example even during the production of the stringer. In this case, it is particularly advantageous to select the first precuring/curing temperature for the auxiliary material in such a manner that the auxiliary material is solidified to an extent in order to be able to support the geometry of the stringer during the curing of the same, and that the auxiliary material simultaneously has deformability during the fitting on the structural component in order to be able to assume the contour thereof.

The application of a vacuum film during the curing process advantageously no longer leads to the stringer being deformed or tilting, since its geometry is advantageously supported by the supporting elements comprising the precured or cured auxiliary material during pressurization under, in particular, the action of heat. Upon an increase in the temperature because of the action of heat, the stringer material, which initially softens in the process, can neither be deformed nor tilt. The auxiliary material is subsequently removed from the stringer with the aid of the separating film.

The stringer and/or the structural component are advantageously produced from a fiber composite material. The adhesive bonding can take place by inserting a resin matrix into the preferably still unimpregnated structural component. The resin matrix of the stringer can be softened assisted by the action of heat without its geometry changing, since the stringer is advantageously supported by the auxiliary material which is precured or cured to form supporting elements.

The stringer generally has an approximately constant cross section in the longitudinal direction. It may also be rectilinear or curved in the longitudinal direction. The at least one profiled stringer can be produced as a T-support and/or I-shaped support. Of course, other shapes are also conceivable.

BRIEF DESCRIPTION OF THE DRAWINGS

The present invention is explained in more detail below using exemplary embodiments and with reference to the attached figures of the drawing, in which.

In the figures, the same reference numbers refer to identical or functionally identical elements, unless something to the contrary is stated.

DETAILED DESCRIPTION OF THE INVENTION

Figure 1:
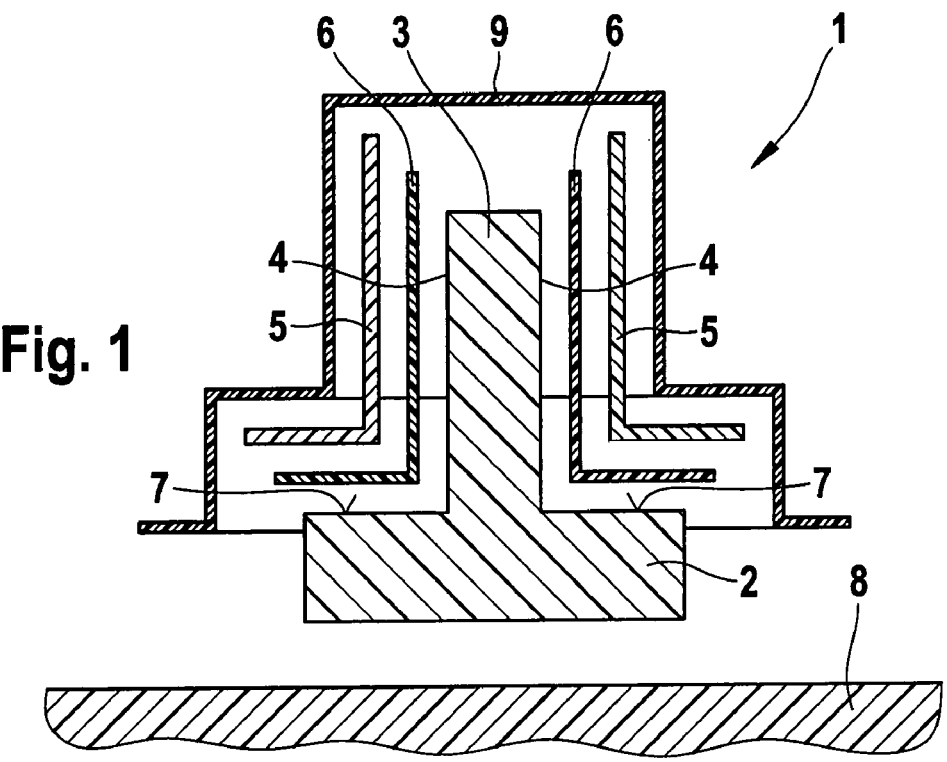
FIG. 1 shows a cross-sectional view of a stringer in an exploded illustration to explain a method according to an exemplary embodiment of the present invention.

FIG. 1 illustrates a stringer 1 by way of example with a T-shaped cross-sectional profile. The longitudinal axis of the stringer 1 runs perpendicularly through the plane of the sheet. In the present example, the cross section is of symmetrical design and stands by way of example for various other stringers or profiled structural components which are used in an aircraft or spacecraft during production or else are used in other vehicles or arrangements. Other frequently used forms of stringers have, for example, a simple L-shape or the like in cross section.

In the example illustrated, the stringer 1 has a joining section 2 and a web section 3 which is arranged centrally standing vertically on the joining section 2. The joining section 2 is arranged with its lower side on a surface of a structural component 8, which is only illustrated schematically and not fully. The structural component 8 can form, for example, a panel or a surface for a rudder unit.

The stringer 1 and the structural component 8 may be produced from a fiber composite material. The structural component 8 is typically precured.

In the present case, the joining section 2 has, on its side opposite the lower side, surfaces 7 which are adjacent to the web section 3. The web section 3 has web flanks 4 on its two longitudinal sides in the direction of the longitudinal axis of the stringer 1.

After production of the stringer 1, a separating film 6 is advantageously first of all deposited onto these web flanks 4 in such a manner that the surfaces 7 of the joining section 2 are also at least partially covered. An auxiliary material 5 is then deposited onto the separating film 6. This can take place automatically by means of a robot or else in a manual laying method.

The auxiliary material 5 may be designed as a rapidly curing low-temperature prepreg, for example as a glass prepreg. It is precured/cured at a first precuring/curing temperature after being deposited on the stringer 1. The first precuring or curing temperature is lower than a second curing temperature of the material of the stringer 1, as a result of which, during this process, only the auxiliary material 5 is precured/cured. The auxiliary means advantageously stiffens in such a manner that, in the present example, it forms L-shaped supporting elements which support the web flanks 4 of the web section 3 of the uncured stringer 1. For example, the auxiliary material 5 still retains a certain deformability so that the stringer 1, when deposited onto the structural component 8, can be matched to the possibly nonrectilinear contour thereof.

In another embodiment, the auxiliary material 5 is deposited on the stringer 1 when the latter is already located on the structural component 8.

Figure 2:
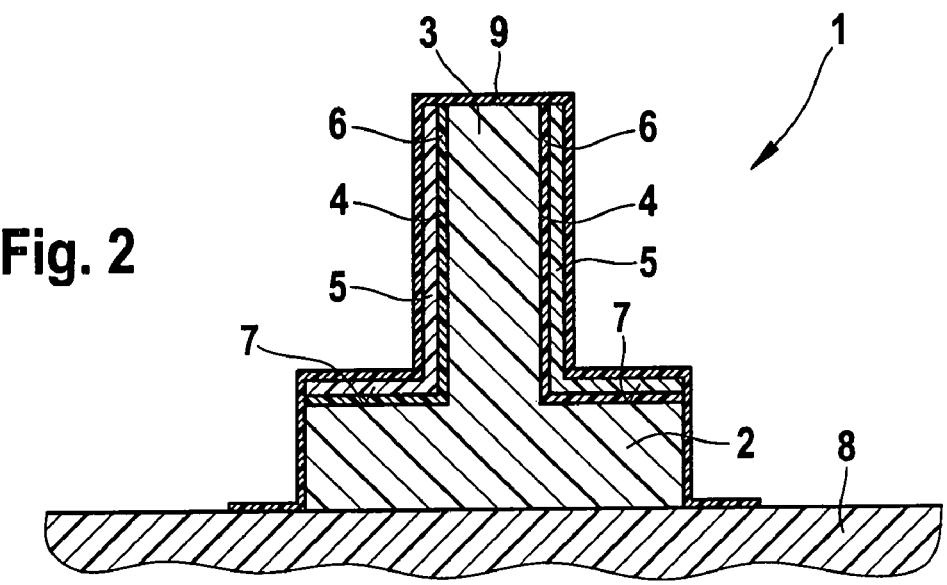
FIG. 2 shows the stringer according to FIG. 1 during its joining to a structural component according to an exemplary embodiment of the present invention.

The uncured stringer 1 supplied in this manner is subsequently deposited on the structural component 8 for joining to the latter, with, in the present example, the lower side of the joining section 2 of the stringer 1 resting on the surface of the structural component 8, as illustrated in FIG. 2.

A vacuum film 9 is subsequently placed over the covered stringer 1 and the surface of the structural component 8. By applying a vacuum between the vacuum film 9 and the surface of the structural component 8, the ambient pressure causes the stringer 1 to be pressed onto the structural component 8.

In one method, the stringer 1 and the structural component 8 are heated to a predetermined curing temperature such that a resin matrix of the fiber composite material of the stringer 1 is softened and becomes sticky. The heating can be brought about, for example, in an autoclave for an injection method.

Before curing of the material of the stringer 1 takes place, this material passes through a softening phase. In this case, the web section 3 of the stringer 1 is supported by the already precured supporting elements composed of the auxiliary material 5 in such a manner that the web section 3 can neither tilt nor be deformed under the action of the pressurization and of the vacuum film 9.

After the covered stringer 1 is joined to the structural component 8, the vacuum film 9 is removed. Subsequently, the supporting elements made of the auxiliary material 5 are then detached from the stringer 1, which is T-shaped for example. The detaching is advantageously simplified and facilitated, since the separating film 6 which has already been mentioned previously is arranged as a separating element between the auxiliary material 5 and the web section 3 or the surfaces 7 of the joining section 2.

The sequence of depositing the auxiliary material 5 and of arranging the stringer 1 on the structural component 8 can be interchanged as a function of the work piece to be produced. Generally, it is advantageous first of all to deposit the auxiliary material 5, since the web flanks 4 to be supported are more easily accessible at this time.

Although the present invention has been described with reference to exemplary embodiments, it is not restricted thereto, but rather can be modified in diverse ways.

For example, the surfaces 7 of the joining section 2 may only partially be covered by the separating element 6 and the auxiliary material 5.

Asymmetrical cross-sectional forms of the stringers can also be used.

Of course, use of the method according to the invention for structural components in general vehicles or else in different arrangements outside the vehicle sphere is possible.

What is claimed is:

1. A method for joining an uncured stringer to a structural component of an aircraft or spacecraft, comprising the following method steps:

providing the uncured stringer, which comprises at least one joining section and at least one web section;

depositing a rapidly curing low-temperature auxiliary material on web flanks of the at least one web section, which are to be supported;

fitting the at least one joining section of the uncured stringer to the structural component;

precuring/curing the auxiliary material at a first precuring/curing temperature in order to form precured/cured supporting elements for the web flanks of the at least one web section, which are to be supported;

curing the uncured stringer at a second curing temperature which is greater than the first precuring/curing temperature; and removing the deposited and cured auxiliary material.

2. The method according to claim 1, wherein the auxiliary material is additionally deposited at least partially on surfaces of the joining sections that are adjacent to the web flanks.

3. The method according to claim 1, wherein, before the rapidly curing low-temperature auxiliary material is deposited, a separating element is deposited at least onto regions for which the auxiliary material is provided.

4. The method according to claim 3, wherein the separating element is deposited in the form of a separating film.

5. The method according to claim 1, wherein the first precuring/curing temperature is selected as the precuring/curing temperature in such a manner that the auxiliary material obtains a rigidity required for preventing the web section from tilting, the auxiliary material simultaneously maintaining deformability in order to adapt the uncured stringer to a contour of the structural component when fitting to the same.

6. The method according to claim 1, wherein, before the uncured stringer is cured, a vacuum film is deposited over the uncured stringer, which is provided with the auxiliary material, and at least partially over the structural component for pressurization, under the action of heat, pressing and joining of the stringer to the structural component.

7. The method according to claim 1, wherein at least one of the stringer and the structural component is produced from a fiber composite material.

8. The method according to claim 1, wherein the stringer is at least one of a T-support and an I-shaped support.

* * * * *